United States Patent [19]
McCombs

[11] Patent Number: 5,175,971
[45] Date of Patent: Jan. 5, 1993

[54] UTILITY POWER POLE SYSTEM

[76] Inventor: P. Roger McCombs, 6472 "A" Windy Rd., Las Vegas, Nev. 89119

[21] Appl. No.: 716,857

[22] Filed: Jun. 17, 1991

[51] Int. Cl.$^5$ .................. E04C 3/30; E04C 3/34; E04C 3/2; E04B 1/38
[52] U.S. Cl. ........................ 52/721; 52/710; 52/722; 52/697
[58] Field of Search ............. 52/721, 40, 710–711, 52/730–731, 281–282, 727, 697

[56] References Cited

U.S. PATENT DOCUMENTS

| | | | |
|---|---|---|---|
| 2,841,634 | 7/1958 | Kimball | 174/45 |
| 3,013,584 | 12/1961 | Reed et al. | 138/145 |
| 3,186,561 | 6/1965 | Strassle | 52/282 X |
| 3,813,837 | 6/1974 | McClain | 52/721 X |
| 4,040,228 | 8/1977 | Skubic | 52/710 |
| 4,073,113 | 2/1978 | Oudot | 52/710 |
| 4,142,343 | 3/1979 | Trafton | 52/721 |
| 4,194,338 | 3/1980 | Trafton | 52/721 |
| 4,202,520 | 5/1980 | Loos et al. | 248/68 |
| 4,458,455 | 7/1984 | Tollstoff de Voss | 52/40 X |
| 4,488,844 | 12/1984 | Baubles | 52/710 X |
| 4,583,359 | 4/1986 | Staeger | 51/721 |
| 4,702,057 | 10/1987 | Phillips | 52/514 |
| 4,738,058 | 4/1988 | Svensson | 52/730 X |
| 4,751,804 | 6/1988 | Cazaly | 52/722 |
| 4,803,819 | 2/1989 | Kelsey | 52/309 |

Primary Examiner—David A. Scherbel
Assistant Examiner—Beth A. Aubrey
Attorney, Agent, or Firm—John Edward Roethel

[57] ABSTRACT

A utility power pole system comprises a pultruded hollow primary pole having an external hexagonal cross section and a number of longitudinal exterior grooves along its length. The hollow primary pole also has an internal hexagonal cross section rotated 30° relative to the external hexagonal cross section. One or more pultruded hollow liners are provided which are also hexagonal in cross section and which may be internally or externally concentric with the primary pole. These liners vary in length to achieve an effective structural taper to the power pole system. The insertion of a tapered liner in the lower portion of the utility pole results in a utility pole having the effective load bearing capability of a tapered utility pole. By using a plurality of overlapping liners of varying lengths, an effective taper can be provided to the utility pole. The longitudinal grooves in the outer surface of the primary pole provide a means for climbing for a utility lineman and a means for attaching accessory attachment devices such as cross arms, stiffening members, conductor supports and for interconnection with other structural elements in a more extensive system. The rounded edges of each longitudinal groove are directed inwardly so as to retain devices in the groove which conform to the cross section of the groove. Cross arms attached to the utility pole may also employ similar longitudinal grooves to facilitate interconnection with existing utility hardware or other components.

24 Claims, 7 Drawing Sheets

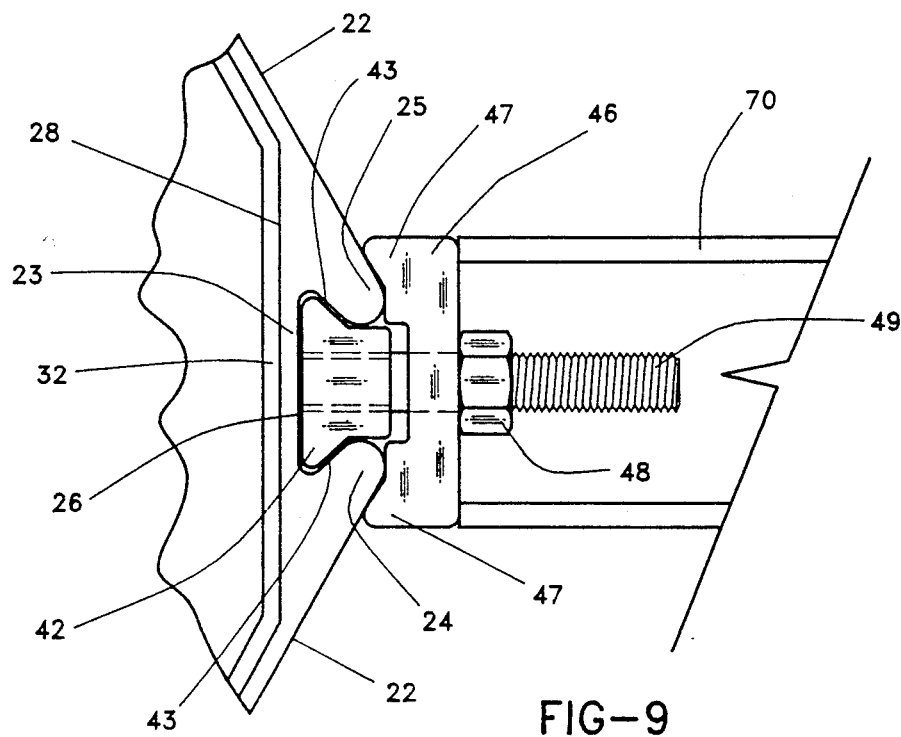
FIG-9
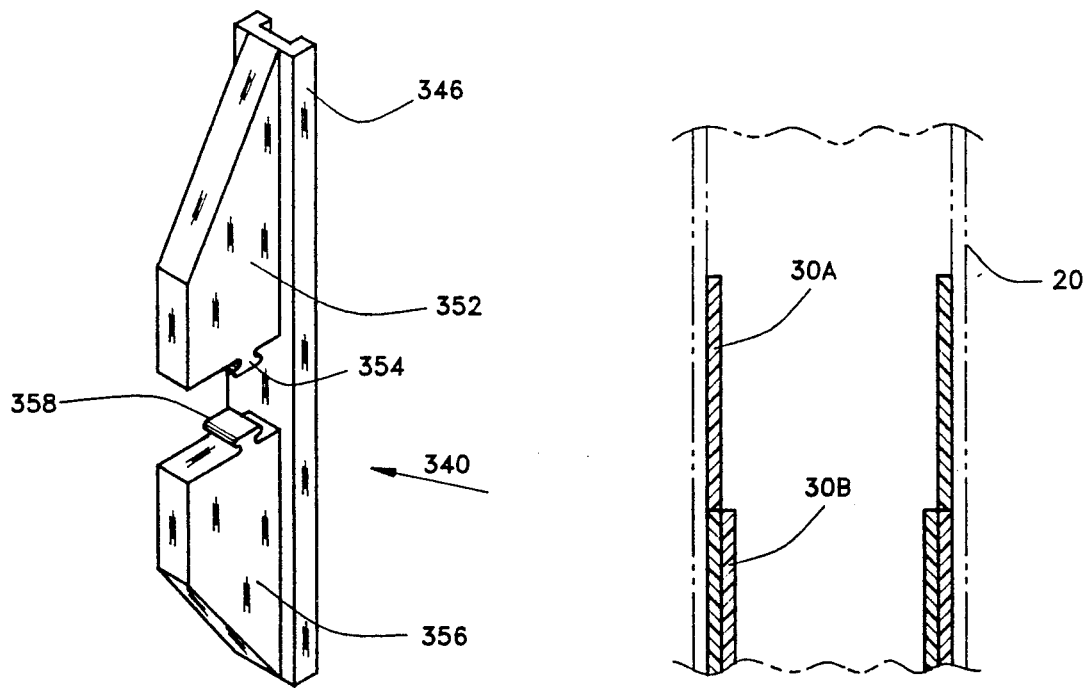
FIG-7
FIG-10

UTILITY POWER POLE SYSTEM

This invention relates to a utility power pole system, and more particularly to a utility power pole system including a primary pole, a liner and accessories manufactured primarily from pultruded material.

BACKGROUND OF THE INVENTION

Electrical power lines and communication lines have long been supported above ground by utility poles. Traditionally, utility poles are made from wood, steel and reinforced or prestressed concrete.

Wooden utility poles consist of a natural substance and are subject to biological attack from microorganisms, insects, mammals and birds. Wooden utility poles are also threatened natural forces such as wind, rain, ultraviolet light and lightning. To counter these threats, wooden utility poles are typically treated with various chemical agents to retard decay and degradation. The problem with the use of chemical agents is the increasingly stringent environmental regulation affecting the use of harmful chemical materials.

The structural degradation of wooden utility poles may be difficult for a utility lineman to ascertain. Degraded utility poles present unsafe climbing situations. Wooden utility poles are also highly flammable. If the wooden utility poles become water soaked, then their enhanced electrical conductivity causes a safety hazard for the utility linemen and bystanders. In contrast, utility poles made from composite pultruded material are non-conductive, corrosion resistant and resistant to other forms of biological attack.

Steel utility poles also are subject to corrosion and are conductive of electricity; in order to avoid the conductivity problem, steel utility poles must be provided with heavy insulation which increases their weight and expense. The high weight of steel utility poles makes them difficult to install. The expense of fabricating steel utility poles is quite large, particularly including the necessary insulation, and significantly more than the cost of fabricating utility poles made from composite pultruded material.

Reinforced or prestressed concrete utility poles alleviate the conductivity problem of steel utility poles and alleviate the environmental problems of wooden poles. But concrete utility poles are significantly heavier than steel or wooden utility poles and the freight cost in transporting concrete utility poles throughout the country side limits their use to areas close to the manufacturing plant where they are made.

It has been proposed to make utility poles from pultruded composite materials. Representative of this technology is U.S. Pat. No. 4,803,819 (Kelsey), the disclosure of which is incorporated herein by this reference thereto.

It is a primary object of the present invention to provide an improved design of a utility power pole system comprising a hollow primary pole having an external hexagonal cross section and an internal hexagonal cross section rotated 30° relative to the external hexagonal cross section. This arrangement creates a triangular area at each corner of the primary pole to give the power pole system increased structural strength. The increased structural strength permits the use of accessories attached to the power pole by means of a cantilevered connection. The design also eliminates approximately 75% or more of the weight that would be found in a conventional wooden, steel or concrete power pole. Additionally, an external or internal concentric liner or a series of overlapping liners, each also having a hexagonal cross section, are interfit inside the primary pole to further increase the lateral bending strength of the power pole system and to increase the structural efficiency of the utility pole by means of an effective structural taper.

It is a further object of the present invention to provide an improved utility power pole system that is made by a process involving the pultrusion of glass reinforced fiber material. The material is pultruded through specially designed dies to create the primary pole and the liner in the desired cross sections. The primary pole and the liner can be pultruded in any desired length or even cut to the necessary lengths after pultrusion. The pultrusion process allows the creation of longitudinal dove tail grooves along the exterior surface of the primary pole which grooves provide a convenient means of attachment to the utility pole of any desired accessories such as cross arms used to hold the electrical wires that are supported by the utility power pole.

Another object of the present invention is to provide a convenient means to integrate the utility pole into more complex support structures such as an H-frame power pole assembly and other combinations of structures.

Another object of the present invention is to provide a means for linemen to climb the utility pole; reduce manufacturing, handling and transportation costs through reducing the weight of the utility pole; and to improve the safety, corrosion resistance and resistance to biological and environmental degradation of the utility pole.

It is an advantage of the present invention that a fiber reinforced composite material utility pole can be made which weighs 25% or less of the weight of an equivalent wooden utility pole and many times less than the weight of an equivalent reinforced concrete utility pole. This substantially reduces the shipping and handling costs for utility poles made from pultruded materials.

It is a further advantage of the present invention that the use of internal or external concentric pultruded material liners achieves a structurally tapered utility pole from elements having constant cross sections. By increasing the number and length of the various liners, the same primary utility pole can be used to achieve a structurally tapered utility pole having a substantial length and significant resistance to lateral bending forces.

It is a further advantage of the present invention that the longitudinal grooves provided in the outer surface of the utility pole allow a utility workman to climb the utility pole as well as providing a means for attaching accessory components to the utility pole. When the base of the utility pole is set in concrete, the grooves are mechanically engaged by the concrete and provide resistance to the utility pole pitching or twisting about its base.

It is a further advantage of the present invention that the composite materials used to make the utility pole are resistant to acids and bases in the soil and airborne corrosives such as salt water spray. The utility pole are also highly resistant to penetration by birds, insects and mammals and are quite resistant to attack by microorganisms such as fungi. Fire retardants can be added to the pultruded material matrix which results in a utility pole having a fire resistance superior to that of wooden utility poles. A system of external coatings, external ultraviolet absorbing fibers and ultraviolet resistant resins assures that the utility pole will have slow ultraviolet degradation which enhances the long life of the utility pole.

It is a further advantage of the present invention that the composite materials from which the pole is made provide high dielectric strength as well as arc and track resistance which allows the separation between current carrying conductors to be inches instead of the feet separations which are used in a conventional wooden utility pole assembly. The reduced separation distance allows corresponding reductions in pole height and cross member lengths. The composite materials used in the utility pole absorb little moisture other than surface wetting during rainstorms, and therefore their electrical conductivity is low under moist conditions. This eliminates the need for miles of conductors which would normally be required for lightening protection.

The outer surface of the utility pole is smooth and non-toxic which eliminates the risk to utility lineman from creosote, penta burns, rashes and slivers. The smooth outer surface prevents animals from climbing the utility pole. The surface of the utility pole can be colored and/or patterned to blend into the surrounding area so that concerns over environmental appearance can be mitigated.

It is a further advantage of the present invention that the utility pole is equipped with a conical closure on its top. The pitch of the conical closure prevents birds from perching on the utility pole. The longitudinal grooves in the surface of the utility pole cooperate with the conical top to create openings in the overhang area underneath the conical top to provide convective cooling of the interior of the utility pole.

SUMMARY OF THE INVENTION

These objects, features and advantages of the present invention are realized by a utility power pole system comprising a pultruded hollow primary pole having an external hexagonal cross section and a number of longitudinal exterior grooves along its length. The hollow primary pole also has an internal hexagonal cross section rotated 30° relative to the external hexagonal cross section. Additionally, one or more pultruded hollow liners are provided which are also hexagonal in cross section and which may be internally or externally concentric with the primary pole. These liners can vary in length to achieve an effective structural taper to the power pole system. A number of accessory attachment devices can be interfit into the longitudinal grooves. The accessory attachment devices include climbing devices, brackets and gusset attachment devices to which other elements may be added.

The primary pole may be used singly to achieve a utility pole having a constant cross section. However, a utility pole is typically loaded near its top from the weight of the power or communication lines attached thereto as well as the accessory attachments associated with the power or communication lines. The bending effects of these top loads increase toward the base of the utility pole. Thus, a constant cross section utility pole which is adequate to handle the bending load at the base of the utility pole is overstrong for handling the weight loading above the base of the utility pole. The use of one or more overlapping liners inside or outside the lower portion of the primary pole results in a utility pole system having the effective load bearing capability of a tapered utility pole. By using a plurality of overlapping liners of varying lengths, an effectively ideal taper can be provided to the utility pole.

The longitudinal grooves in the outer surface of the primary pole provide a means for utility linemen to climb the power pole and also a means for attaching accessories such as cross arms, stiffening members, conductor supports and tee brackets and for interconnection with other structural elements in a more extensive system. The rounded edges of each longitudinal groove are directed inwardly so as to retain devices in the groove which conform to the cross section of the groove. The cross arms attached to the utility pole may also employ similar longitudinal grooves to facilitate interconnection with existing utility hardware or other components such as brackets and gussets. The groove provides a means of achieving a range of attachment strengths in that the length of the groove engaged by the attachment can be adjusted.

BRIEF DESCRIPTION OF THE DRAWINGS

FIG. 7 shows a perspective view of another accessory attachment device for the composite utility power pole of the present invention.

FIG. 9 shows a detailed view of the connection of a accessory attachment device to the longitudinal groove in the composite utility power pole of the present invention.

FIG. 10 shows the liners used with the composite utility power pole of the present invention mounted in overlapping relationship on the interior of the power pole.

DETAILED DESCRIPTION OF THE PREFERRED EMBODIMENTS

Figure 1:
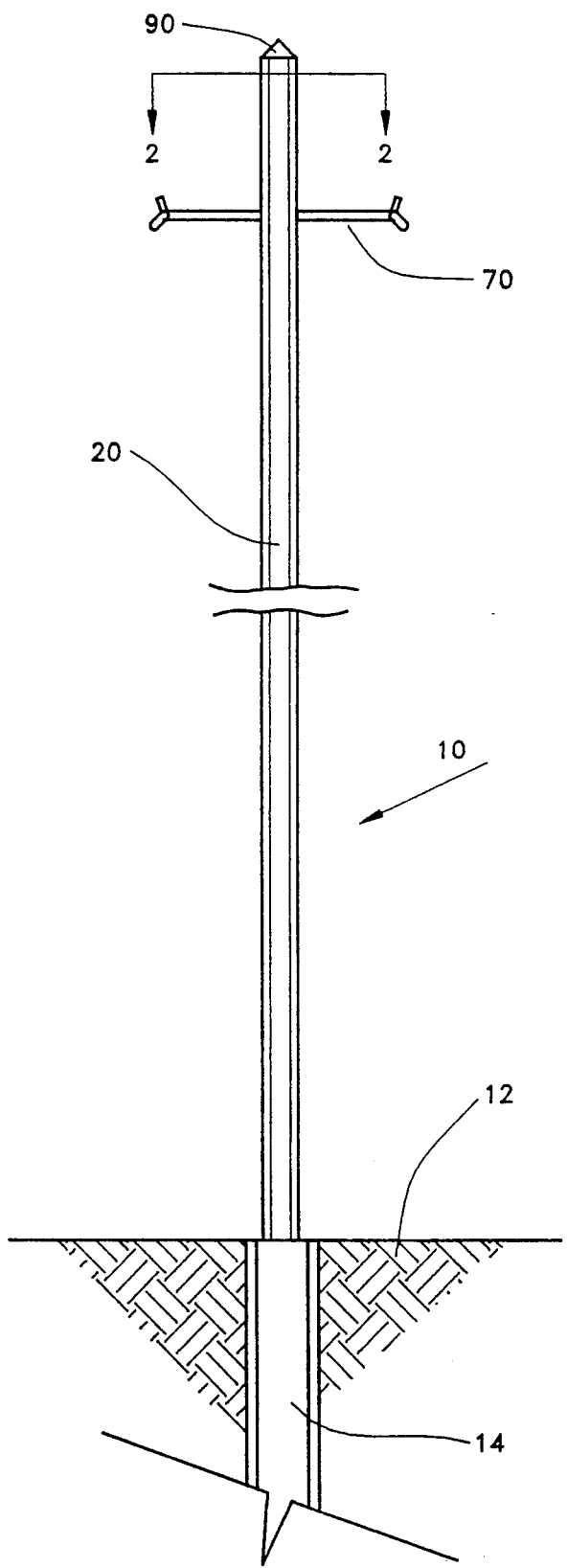
FIG. 1 shows the composite utility power pole of the present invention mounted in the ground.

The composite utility power pole system of the present invention is shown generally at 10 in FIG. 1. The composite utility power pole system 10 comprises a primary pole 20 fabricated of any suitable predetermined length depending on the application for which it is needed. The primary pole 20 is mounted into the ground 12 in a conventional manner, preferably using concrete 14 to rigidly secure the primary pole 20 into the ground 12.

Toward the upper end of the primary pole 20, one or more cross arms 70 are provided to support electrical wires as is conventional for utility power poles. Each cross arm 70 is attached to the primary pole 20 in a manner which will be described below.

Figure 2:
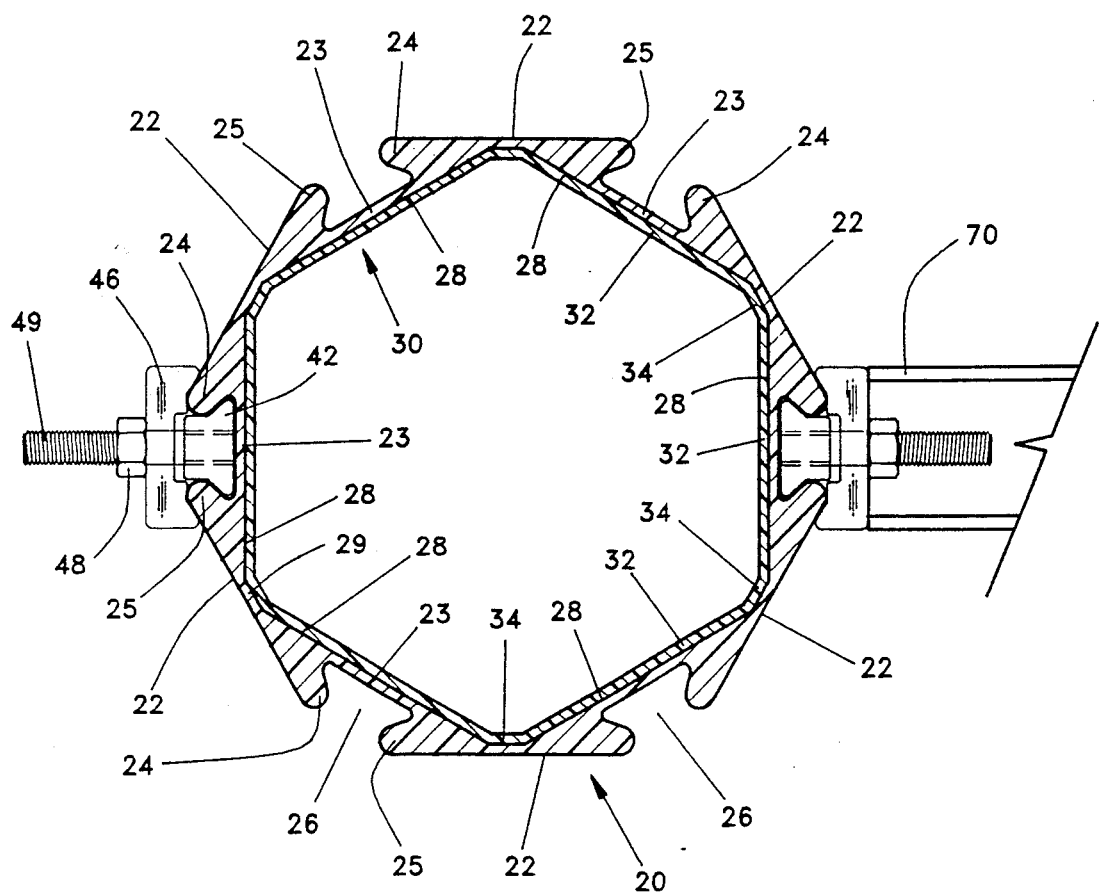
FIG. 2 shows a cross section of the composite utility power pole of the present invention taken along line 2—2 of FIG. 1.

Referring now to FIG. 2, a cross section of the primary pole 20 is shown. The primary pole 20 is hollow along its entire length. When viewed in cross section, the exterior surface of the primary pole 20 has a generally hexagonal cross section and each exterior side 22 of the hexagon forming the exterior surface is a generally flat side.

Again looking at the cross section of the hollow primary pole 20, the interior surface of the primary pole 20 also has a generally hexagonal cross section and each interior side 28 of the hexagon forming the interior surface is a generally flat side. Each interior side 28 of the hexagon forming the interior surface is rotated approximately 30° relative to a corresponding exterior side 22 of the hexagon forming the exterior surface.

This configuration results in a generally triangularly-shaped vertex 23 at each external corner of the primary pole 20 in which is provided a longitudinal dove tail groove 26 that extends the entire length of the primary pole 20. The opening into the dove tail groove 26 is defined by a first rounded finger 24 and a second rounded finger 25 to eliminate sharp edges. This allows any attachments that are mounted in the dove tail groove 26 to slide easily up and down in the groove and to prevent possible injuries to the utility workmen who may be climbing the primary pole 20.

In the preferred embodiment of the present invention as shown in FIG. 2, there are six triangular shaped vertices 23 and corresponding dove tail grooves 26 positioned equally spaced around the perimeter of the primary pole 20. This allows attachments to be connected to the primary pole 20 at a multitude of angles and orientations.

As shown in FIG. 2, a cross arm 70 can be attached to the primary pole 20 in one of the dove tail grooves 26 and a corresponding cross arm could also be attached at a diametrically opposite position on the primary pole 20. This would leave four open dove tail grooves 26 which can be used by a utility workman to climb the primary pole 20 for maintenance and repair or for the attachment of other accessory devices.

The hexagon shape forming the interior surface of the primary pole 20 includes a flat corner portion 29 at the joinder of two adjacent interior sides 28, each flat corner portion 29 being positioned opposite approximately the midpoint of a corresponding exterior side 22 of the hexagon shape forming the exterior surface of the primary pole 20.

Referring further to FIG. 2, a liner 30 is provided on the interior of the primary pole 20. The liner 30 is hollow and has a generally hexagonal cross section on both its interior surface and its exterior surface along its entire length. The liner 30 is made up of a plurality of main sides 32 which form the hexagonal shape of the liner 30. The liner also has a flat corner 34 between adjacent main sides 32. Each flat corner 34 is positioned adjacent a corresponding flat corner portion 29 on the interior surface of the primary pole 20. This arrangement fits the liner 30 into the primary pole 20 and prevents the liner 30 from moving or sliding sideways on the inside of the primary pole 20.

Figure 8:
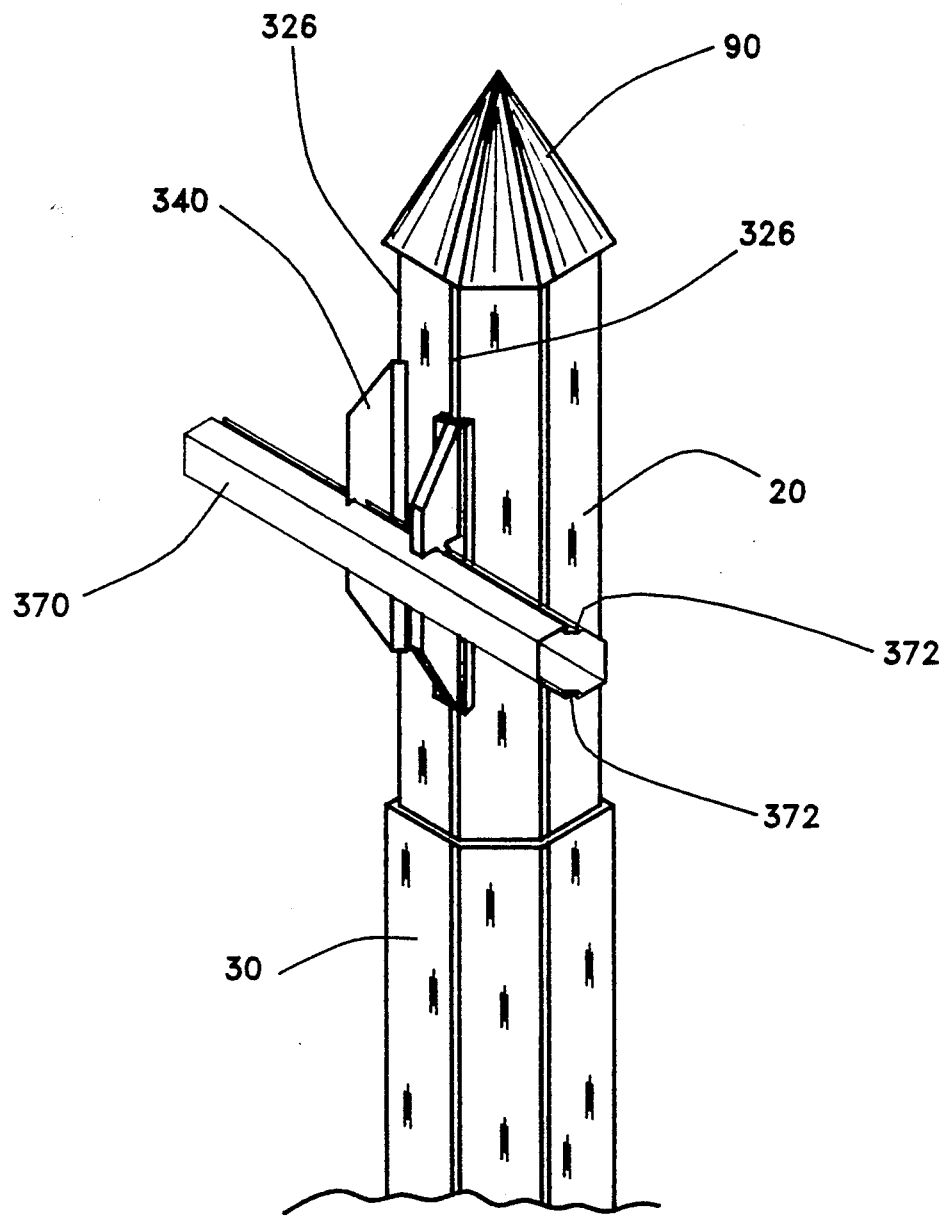
FIG. 8 shows a perspective view of the composite utility power pole of the present invention with a pair of accessory attachment devices connected thereto to mount a cross arm to the power pole system.

In one embodiment of the present invention the liner 30 is of uniform wall thickness and extends the entire length of the primary pole 20. Alternatively, the wall thickness of the liner 30 can be thicker toward the bottom of the primary pole 20 and thinner toward the top of the primary pole 20 so that the composite utility power pole system 10 has more resistance to tipping or bending toward its bottom. In one embodiment, this varying wall thickness of the liner 30 can be effected by having a single liner 30 which is thicker at the bottom and thinner at the top. Alternatively, as shown in FIG. 10, the lower regions of the primary pole 20 can be provided with a plurality of overlapping liners, 30A and 30B, while the upper regions of the primary pole 20 can be provided with a single liner 30A or none at all. In yet another embodiment of the invention, one or more liners can be positioned on the exterior side of the primary pole 20 to strengthen the primary pole, for example as shown in FIG. 8. Any combination of inner liners and outer liners can be used to effect the desired strength and bending resistance of the primary pole 20.

Figure 3:
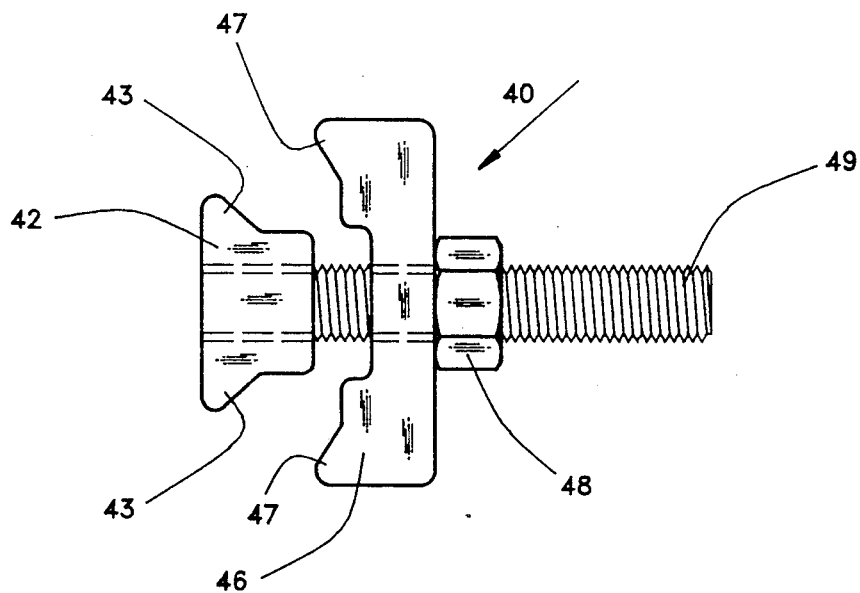
FIG. 3 shows an accessory attachment device for the composite utility power pole of the present invention.

Referring to FIGS. 3 and 9, the details of the accessory attachment device 40 are shown. The accessory attachment device 40 comprises an inside fastener 42 shaped to have a cross section corresponding to the cross section of the dove tail groove 26 so that the inside fastener 42 can slid up or down in the dove tail groove 26. The inside fastener includes slanted gripping surfaces 43 that will cooperate with the insides of the rounded fingers 24 and 25 on the vertex 23 of the primary pole 20 as will be explained.

The inside fastener 42 has extending therefrom in a direction outward from the dove tail groove 26 at least one threaded bolt 49, although more than one bolt 49 may be used if desired and depending on the weight of the accessory device that is to be attached to the primary pole 20. In the preferred embodiment, two bolts 49 are used to securely hold the accessory attachment device 40 against the primary pole 20.

The accessory attachment device 40 also includes an outside fastener 46. The outside fastener also includes slanted gripping surfaces 47 that will cooperate with the outsides of the rounded fingers 24 and 25 on the vertex 23 of the primary pole 20 as will be explained. The outside fastener also includes an aperture 45 therethrough for receiving each threaded bolt 49 on the inside fastener 42. A threaded nut 48 is mounted on each threaded bolt 49 for securing the outside fastener 46 around the primary pole 20 and to the inside fastener 42. This accessory attachment device 40 can then receive a cross arm 50 attached to the outside fastener 46 in any suitable or conventional manner.

As more clearly shown in FIG. 9, when the inside fastener 42 is positioned at the desired location inside the dove tail groove 26, the outside fastener 46 can be screwed down against the primary pole 20. The gripping surfaces 47 of the outside fastener 46 will exert pressure upon the outside surfaces of the first rounded finger 24 and the second rounded finger 25. This causes the inner surfaces of the first rounded finger 24 and the second rounded finger 25 to exert pressure on the gripping surfaces 43 of the inside fastener 42. This securely holds the inside fastener 4 at the desired location inside the dove tail groove 26 and prevents the entire accessory attachment device 40 from sliding up or down inside the dove tail groove 26.

The inside fastener 42 can be formed as a single piece and inserted into the dove tail groove 26 from the top of the pole. Alternatively, the inside fastener 42 can be formed in more than one piece in the form of wedge shaped elements and inserted into the dove tail groove 26 at any desired location along the length of the pole. When pressure is applied to secure the inside fastener 42 to the outside fastener 46, the wedge shaped elements will securely fir together in the dove tail groove 26.

As an additional aid in securing the attachment device 40 to the primary pole 20, double sided high bond tape can be placed along the mating surfaces of the first and second rounded fingers and the inside and outside fasteners. Suitable double sided bonding tapes are made by the 3M Industrial Specialties Division of the 3M Company, 3M Center Building, St. Paul, Minn. 55144 and sold under the brand name VHB TM bonding tapes. Also useful are acrylic foam tapes or tapes made from urethane and polymer resins.

Figure 5:
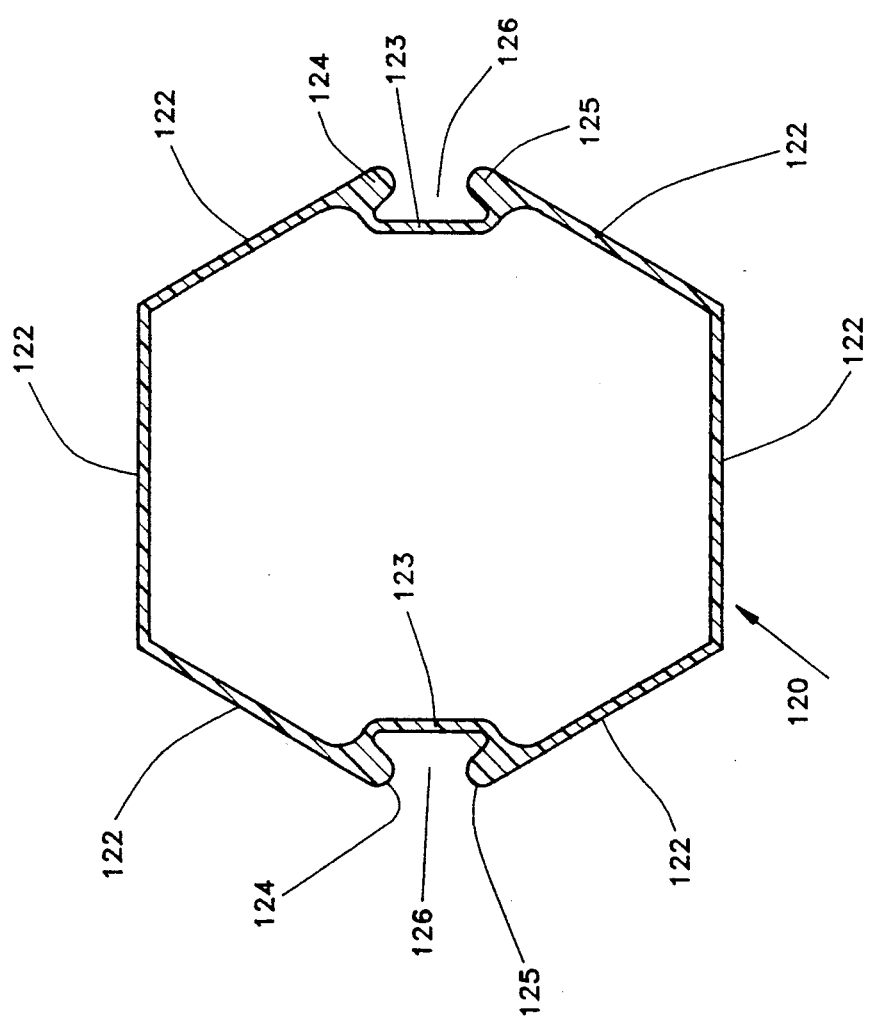
FIG. 5 shows a cross section of an alternate embodiment of the composite utility power pole of the present invention.

Referring now to FIG. 5, an alternate embodiment of a primary pole 120 is shown in cross section. The primary pole 120 is hollow along its entire length. When viewed in cross section the exterior surface of the primary pole 120 has a generally hexagonal cross section and each exterior side 122 of the hexagon forming the exterior surface is a generally flat side.

A dove tail groove 126 is provided at only two opposite vertices 123 of the hexagon. The opening into each dove tail groove 126 is defined by a first rounded finger 124 and a second rounded finger 125 to eliminate sharp edges and to provide a gripping surface to hold any accessory attachment devices that are mounted in the dove tail grooves 126. This primary pole 120 is quite light and can be used where the structural strength requirements of a primary pole are not high.

Figure 6:
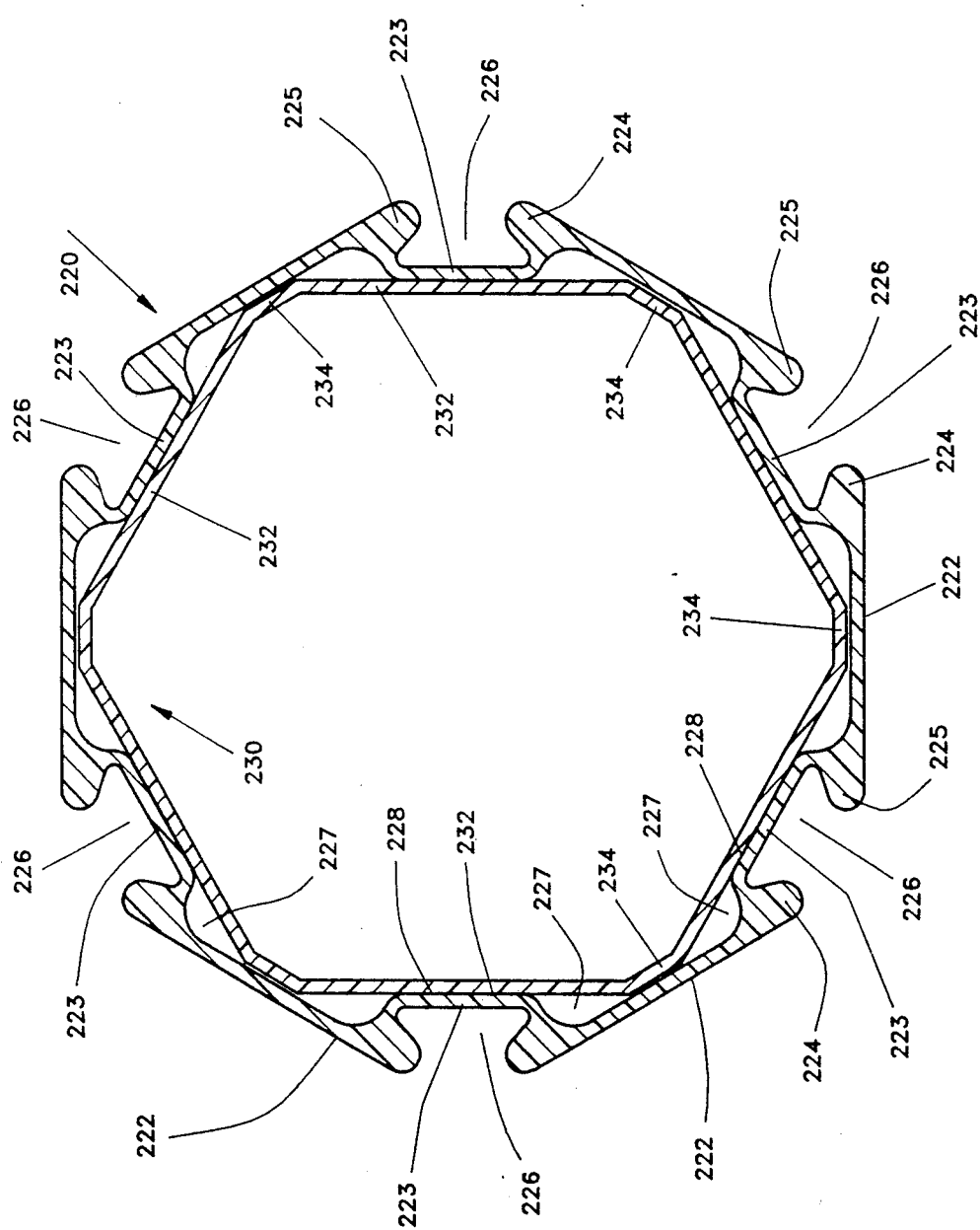
FIG. 6 shows a cross section of another alternate embodiment of the composite utility power pole of the present invention including a liner.

Referring now to FIG. 6, another embodiment of the primary pole 220 is shown in cross section. The primary pole 220 is hollow along its entire length. When viewed in cross section, the exterior surface of the primary pole 220 has a generally hexagonal cross section and each exterior side 222 of the hexagon forming the exterior surface is a generally flat side.

Again looking at the cross section of the hollow primary pole 220, the interior surface of the primary pole 220 also has a generally hexagonal cross section and each interior side 228 of the hexagon forming the interior surface is a generally flat side. Each interior side 228 of the hexagon forming the interior surface is rotated approximately 30° relative to a corresponding exterior side 222 of the hexagon forming the exterior surface.

This configuration results in a generally triangularly-shaped vertex 223 at each external corner of the primary pole 220 in which is provided a longitudinal dove tail groove 226 that extends the entire length of the primary pole 220. The opening into the dove tail groove 226 is defined by a first rounded finger 224 and a second rounded finger 225 to eliminate sharp edges. This allows any attachments that are mounted in the dove tail groove 226 to slide easily up and down in the groove and to prevent possible injuries to the utility workmen who may be climbing the primary pole 220.

In this embodiment as shown in FIG. 6, there are six triangular shaped vertices 223 and corresponding dove tail grooves 226 positioned equally spaced around the perimeter of the primary pole 220. This allows attachments to be connected to the primary pole 220 at a multitude of angles and orientations.

Referring further to FIG. 6, a liner 230 is provided on the interior of the primary pole 220. The liner 230 is hollow and has a generally hexagonal cross section on both its interior surface and its exterior surface along its entire length. The liner 230 is made up of a plurality of main sides 232 which form the hexagonal shape of the liner 230. Between adjacent main sides 232 there is provided a flat corner 234 which is positioned adjacent a corresponding exterior surface 222 of the primary pole 220. Each main side 232 of the liner 230 abuts the interior surface 228 on the back wall of the vertex 223. This arrangement prevents the liner 230 from moving or sliding sideways on the inside of the primary pole 220.

While this arrangement is similar to the arrangement shown in FIG. 2, the area in between the vertices 223 on the interior side of the primary pole 220 is removed or hollowed out resulting in an open space 227 which lessens the overall weight of the primary pole 220.

FIG. 7 shows another accessory attachment device 340 that can be used with the primary pole 20 of the present invention. This accessory attachment device 340 can be connected to the primary pole 20 in the same manner as shown in FIG. 9 for attaching accessory attachment device 40 to the primary pole 20. The accessory attachment device 340 includes an outside fastener 346 having the length of the accessory attachment device 340. An upper mounting arm 352 having a dove tail finger 354 and a lower mounting arm 356 having a dove tail finger 358 are attached to the outside fastener 346 and disposed generally perpendicular to the outside fastener 346. The length of this accessory attachment device 340 can vary from relatively short if used to connect a cross arm 370 as shown in FIG. 8 to relatively long, such as generally the entire length of the pole as when the pole is being used as a dead end pole. In this latter arrangement, the use of an accessory attachment device 340 that runs generally the entire length of the pole provides a vertical stiffening effect to the pole that would eliminate the need for guy wires to orient the pole in a vertical position.

As shown in FIG. 8 two adjoining dove tail grooves 326 in the primary pole 20 are each provided with an accessory attachment device 340. A cross arm 370 is then connected between the adjoining accessory attachment devices 340 by sliding the dove tail fingers 354 and 358 on each accessory attachment device 340 into the dove tail slot 372 in the cross arm 370. The cross arm 370 can have the cross sectional configuration of the pole shown in FIG. 5 and the cross arm 370 can be used to attach other devices necessary for the primary pole 20 to function as a utility or power pole in a utility system.

FIG. 8 also shows the conical cap 90 that can be attached to prevent birds from roosting on the top of the primary pole 20. The lower edges of the conical cap 90 slightly overlap the upper end of the primary pole 20 to resulting in an air space between the bottom of the cap 90 and the top of the primary pole 20. This allows air to circulate under the cap 90 and into the interior of the primary pole 20.

Figure 4:
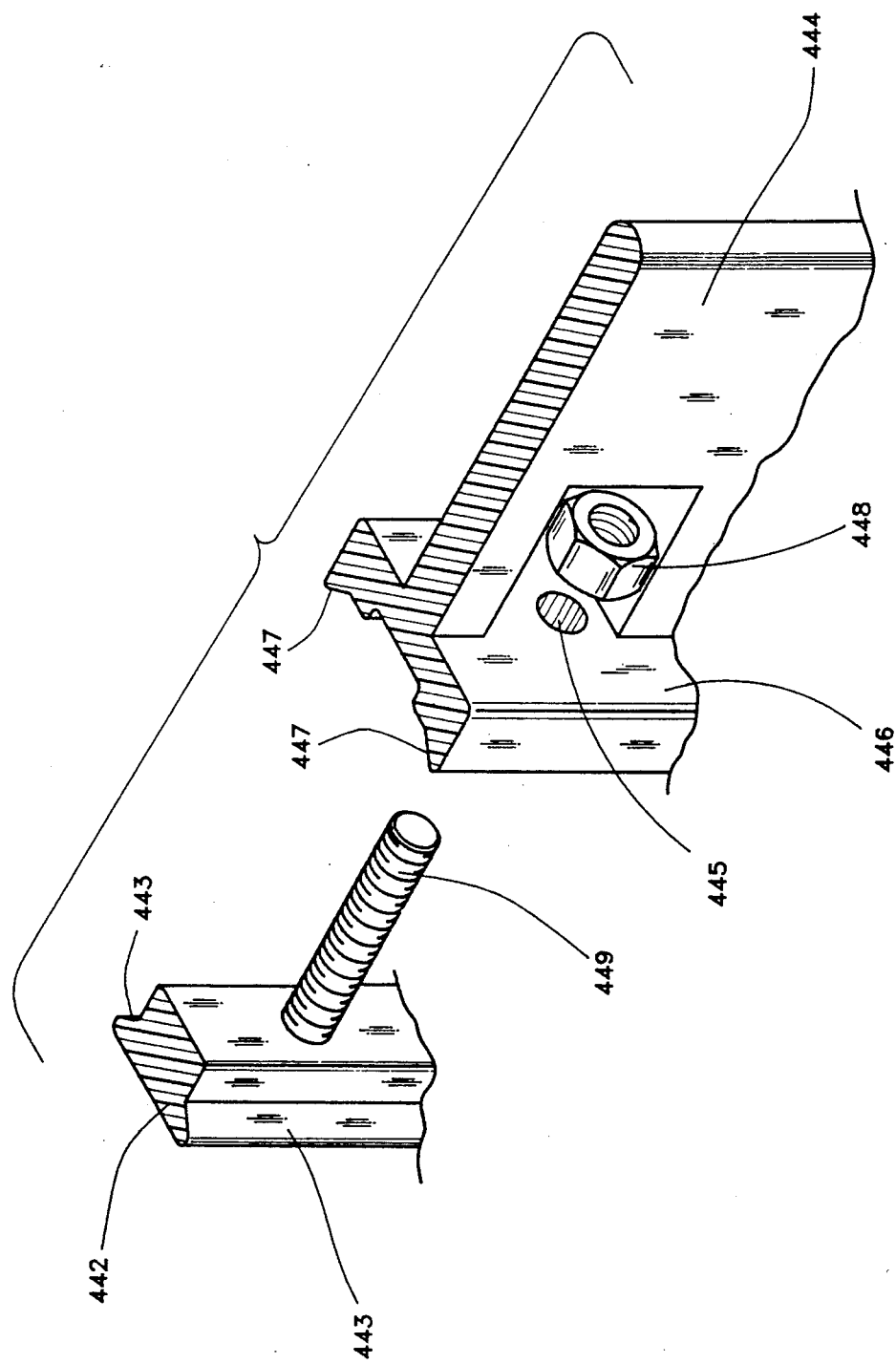
FIG. 4 shows an exploded perspective view of another accessory attachment device of the composite utility power pole of the present invention.

Another type of accessory attachment device that can be used with the present invention is shown in FIG. 4. This accessory attachment device is in the form of a T bracket and also provides a vertical stiffening effect to the pole that would eliminate the need for guy wires to orient the pole in a vertical position. This accessory attachment device can be of any vertical length as desired depending upon the amount of desired stiffening effect the user wishes to give to the utility pole.

The accessory attachment device comprises an inside fastener 442 shaped to have a cross section corresponding to the cross section of the dove tail groove 26 so that the inside fastener 442 can slid up or down in the dove tail groove 26. The inside fastener includes slanted gripping surfaces 443 that will cooperate with the insides of the rounded fingers 24 and 25 on the vertex 23 of the primary pole 20 as was explained in connection with the accessory attachment device shown in FIGS. 3 and 9.

The inside fastener 442 has extending therefrom in a direction outward from the dove tail groove 26 a threaded bolt 449. In the preferred embodiment, there will be provided a plurality of threaded bolts 449, each one approximately every twelve inches along the vertical length of the inside fastener 442. The distance between the bolts 449 may be more or less than twelve inches if desired and depending on the weight of the accessory device that is to be attached to the primary pole 20 and the amount of stiffening that is to be provided to the utility pole.

The accessory attachment device also includes an outside fastener 446. The outside fastener also includes slanted gripping surfaces 447 that will cooperate with the outsides of the rounded fingers 24 and 25 on the vertex 23 of the primary pole 20 as was explained above in connection with the accessory attachment device shown in FIGS. 3 and 9. The outside fastener also includes an aperture 445 therethrough for receiving each threaded bolt 449 on the inside fastener 442. A threaded nut 448 is mounted on each threaded bolt 449 for securing the outside fastener 446 around the primary pole 20 and to the inside fastener 442.

This accessory attachment device is also provided with a stiffening member 444 formed integral with the outside fastener 446. Alternatively, the stiffening member 444 can be a separate element attached to the outside fastener 446 in any suitable or conventional manner.

Each of the primary poles and liners used in the present invention can be made from pultruded composite material in the form and manner described in U.S. Pat. No. 4,803,819 to Kelsey.

Various modifications and additions may be made and will be apparent to those skilled in the art. For example, the hollow interior of the pole can be filled with foam insulation material to provide electrical insulation of the pole. This foam insulation also provides additional stiffening to the pole which increases the strength of the pole as well as eliminating an area in which the pole could become contaminated by foreign substances. A preferred insulation would be polyurethane polymer resins or concrete impregnated with polymer resins.

While the invention has been illustrated with respect to several specific embodiments thereof, these embodiments should be considered as illustrative rather than limiting. Accordingly, the invention should not be limited by the foregoing description, but rather should be defined only by the following claims.

What is claimed is:

1. A primary utility pole made from composite pultruded material and having a predetermined length, the pole being hollow and having the following shape along its entire length:
    a) the exterior surface of the pole having a generally hexagonal cross section, each side of the hexagon forming the exterior surface being generally flat and each vertex of the hexagon forming the exterior surface including a dove tail groove, and
    b) the interior surface of the pole having a generally hexagonal cross section, each side of the hexagon forming the interior surface being generally flat and each side of the hexagon forming the interior surface being rotated approximately 30° relative to a corresponding side of the hexagon forming the exterior surface.

2. The primary utility pole of claim 1 wherein the hexagon forming the interior surface includes a flat corner portion between two adjoining sides of the interior surface, each flat corner portion being positioned opposite approximately the midpoint of each side of the hexagon forming the exterior surface of the pole.

3. The primary utility pole of claim 1 wherein each dove tail groove includes a first rounded finger and a second rounded finger defining an opening into the dove tail groove.

4. The primary utility pole of claim 1 wherein an area of the interior surface of the pole is hollowed out between each adjoining vertex so that the overall weight of the pole is reduced.

5. The utility pole of claim 1 further including an accessory attachment device for attaching at least one accessory member to the primary power pole, the accessory attachment device being mounted in the dove tail groove in the exterior surface of the primary pole.

6. The utility pole of claim 1 wherein the accessory attachment device comprises:
    a) an inside fastener positioned in the dove tail groove, the inside fastener having a shape complementary to the shape of the dove tail groove, and the inside fastener including at least one threaded bolt extending therefrom,
    b) an outside fastener having an aperture therethrough for receiving the threaded bolt on the inside fastener, and
    c) a threaded nut mounted on the threaded bolt for securing the outside fastener to the inside fastener.

7. The utility pole of claim 6 wherein
    a) the inside fastener includes a gripping surface and the outside fastener includes a gripping surface,
    b) each dove tail groove includes a first rounded finger and a second rounded finger defining an opening into the dove tail groove
    whereby the gripping surface on the inside fastener and the gripping surface on the outside fastener will cooperate with the first and second rounded fingers on the dove tail groove to securely hold the accessory attachment device in the dove tail groove.

8. The utility pole of claim 1 wherein the accessory attachment device comprises:
    a) an inside fastener of variable vertical length positioned in the dove tail groove, the inside fastener having a shape complementary to the shape of the dove tail groove, and the inside fastener including at least one threaded bolt extending therefrom,
    b) an outside fastener of variable vertical length having an aperture therethrough for receiving the threaded bolt on the inside fastener,
    c) a threaded nut mounted on the threaded bolt for securing the outside fastener to the inside fastener, and
    d) a stiffening member joined to the outside fastener.

9. The utility pole of claim 8 wherein
    a) the inside fastener includes a gripping surface and the outside fastener includes a gripping surface,
    b) each dove tail groove includes a first rounded finger and a second rounded finger defining an opening into the dove tail groove
    whereby the gripping surface on the inside fastener and the gripping surface on the outside fastener will cooperate with the first and second rounded fingers on the dove tail groove to securely hold the accessory attachment device in the dove tail groove.

10. A primary utility pole made from composite pultruded material and having a predetermined length, the pole being hollow and having the following shape along its entire length:
 a) the exterior surface of the pole having a generally hexagonal cross section, each side of the hexagon forming the exterior surface being generally flat and at least two diametrically opposed vertices of the hexagon forming the exterior surface including a dove tail groove,
 b) the interior surface of the pole having a generally hexagonal cross section, each side of the hexagon forming the interior surface being generally flat, and
 c) each dove tail groove includes a first rounded finger and a second rounded finger defining an opening into the dove tail groove.

11. A utility pole made from composite pultruded material and having a predetermined length, the pole comprising a primary pole and an inner liner wherein:
 a) the primary pole being hollow and having the following shape along its entire length:
  1) the exterior surface of the pole having a generally hexagonal cross section, each side of the hexagon forming the exterior surface being generally flat and each vertex of the hexagon forming the exterior surface including a dove tail groove, and
  2) the interior surface of the pole having a generally hexagonal cross section, each side of the hexagon forming the interior surface being generally flat and each side of the hexagon forming the interior surface being rotated approximately 30° relative to a corresponding side of the hexagon forming the exterior surface, and
 b) the inner liner being hollow and having a generally hexagonal cross section on both its interior surface and its exterior surface along its entire length.

12. The utility pole of claim 11 wherein:
 a) the hexagon forming the interior surface of the primary pole includes a flat corner portion between two adjoining sides of the interior surface, each flat corner portion being positioned opposite approximately the midpoint of each side of the hexagon forming the exterior surface of the pole, and
 b) the hexagon forming the exterior surface of the liner includes a flat corner at each vertex of the hexagon, each flat corner of the liner being aligned with a corresponding flat corner portion on the interior surface of the primary pole.

13. The primary utility pole of claim 11 wherein each dove tail groove includes a first rounded finger and a second rounded finger defining an opening into the dove tail groove.

14. The primary utility pole of claim 11 wherein an area of the interior surface of the pole is hollowed out between each adjoining vertex so that the overall weight of the pole is reduced.

15. The primary utility pole of claim 11 wherein the inner liner comprises a plurality of overlapping liners whereby a lower region of the primary pole is thicker than an upper region so that the primary pole has increased bending resistance.

16. A utility pole system made from composite pultruded material and having a predetermined length, the pole comprising a primary pole, an inner liner and an accessory attachment device wherein:
 a) the primary pole being hollow and having the following shape along its entire length:
  1) the exterior surface of the pole having a generally hexagonal cross section, each side of the hexagon forming the exterior surface being generally flat and each vertex of the hexagon forming the exterior surface including a dove tail groove, and
  2) the interior surface of the pole having a generally hexagonal cross section, each side of the hexagon forming the interior surface being generally flat and each side of the hexagon forming the interior surface being rotated approximately 30° relative to a corresponding side of the hexagon forming the exterior surface,
 b) the inner liner being hollow and having a generally hexagonal cross section on both its interior surface and its exterior surface along its entire length, and
 c) an accessory attachment device for attaching at least one accessory member to the primary power pole.

17. The utility pole of claim 16 wherein:
 a) the hexagon forming the interior surface of the primary pole includes a flat corner portion between two adjoining sides of the interior surface, each flat corner portion being positioned opposite approximately the midpoint of each side of the hexagon forming the exterior surface of the pole, and
 b) the hexagon forming the exterior surface of the liner includes a flat corner at each vertex of the hexagon, each flat corner of the liner being aligned with a corresponding flat corner portion on the interior surface of the primary pole.

18. The primary utility pole of claim 16 wherein an area of the interior surface of the pole is hollowed out between each adjoining vertex so that the overall weight of the pole is reduced.

19. The utility pole of claim 16 wherein the accessory attachment device is mounted in the dove tail groove in the exterior surface of the primary pole.

20. The utility pole of claim 16 wherein the accessory attachment device comprises:
 a) an inside fastener positioned in the dove tail groove, the inside fastener having a shape complementary to the shape of the dove tail groove, and the inside fastener including at least one threaded bolt extending therefrom,
 b) an outside fastener having an aperture therethrough for receiving the threaded bolt on the inside fastener, and
 c) a threaded nut mounted on the threaded bolt for securing the outside fastener to the inside fastener 21. The utility pole of claim 20 wherein
 a) the inside fastener includes a gripping surface and the outside fastener includes a gripping surface,
 b) each dove tail groove includes a first rounded finger and a second rounded finger defining an opening into the dove tail groove
 whereby the gripping surface on the inside fastener and the gripping surface on the outside fastener will cooperate with the first and second rounded fingers on the dove tail groove to securely hold the accessory attachment device in the dove tail groove.

22. The utility pole of claim 21 wherein the outside fastener further includes an upper mounting arm with a dove tail finger and a lower mounting arm with a dove tail finger whereby a second pole having corresponding dove tail grooves can be attached to the utility pole by means of the outside fastener.

23. The utility pole of claim 16 wherein the accessory attachment device comprises:
 a) an inside fastener of variable vertical length positioned in the dove tail groove, the inside fastener having a shape complementary to the shape of the dove tail groove, and the inside fastener including at least one threaded bolt extending therefrom,
 b) an outside fastener of variable vertical length having an aperture therethrough for receiving the threaded bolt on the inside fastener,
 c) a threaded nut mounted on the threaded bolt for securing the outside fastener to the inside fastener, and
 d) a stiffening member joined to the outside fastener.

24. The utility pole of claim 23 wherein
 a) the inside fastener includes a gripping surface and the outside fastener includes a gripping surface,
 b) each dove tail groove includes a first rounded finger and a second rounded finger defining an opening into the dove tail groove
 whereby the gripping surface on the inside fastener and the gripping surface on the outside fastener will cooperate with the first and second rounded fingers on the dove tail groove to securely hold the accessory attachment device in the dove tail groove.

* * * * *